Patented Oct. 27, 1925.

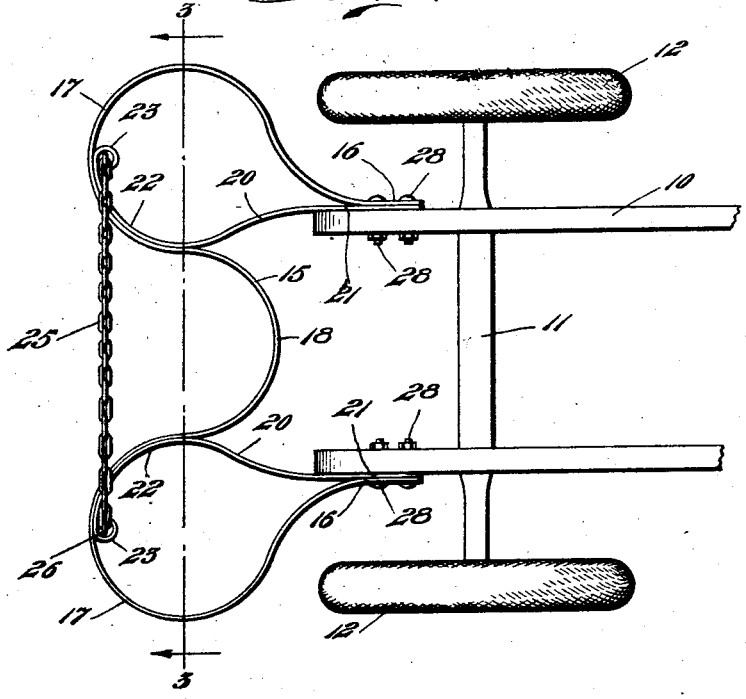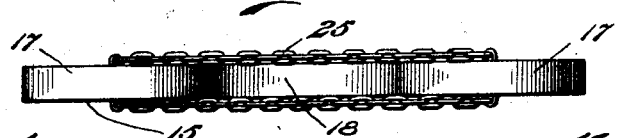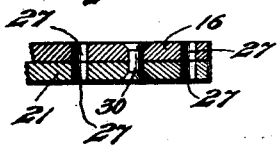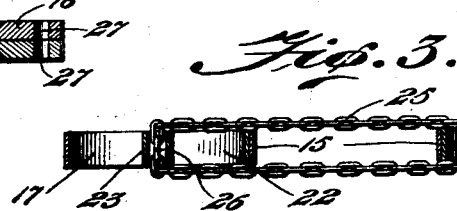

1,559,293

UNITED STATES PATENT OFFICE.

SHEFFIELD SMITH, OF NORTH PROVIDENCE, RHODE ISLAND.

AUTOMOBILE BUMPER.

Application filed April 9, 1925. Serial No. 21,758.

*To all whom it may concern:*

Be it known that I, SHEFFIELD SMITH, a citizen of the United States, residing at North Providence, in the county of Providence and State of Rhode Island, have invented certain new and useful Improvements in Automobile Bumpers, of which the following is a specification.

My invention relates to automobile bumpers of the spring bar type adapted for attachment to either end of an automobile.

The essential objects of my invention are to extensively distribute the shock of a blow and completely absorb the same; to cover a greater protecting area, and to guard against impacts from more directions than heretofore possible; to avoid both the hooked and the U shaped laterally projecting bumper ends that now invite entanglement with neighboring machines; to combine a maximum of strength with a minimum of weight, and to attain these ends in a convenient and inexpensive structure.

My invention consists in the means and mechanism for producing the results above specified substantially as hereinafter claimed.

In the accompanying drawings illustrating the principle of this invention and the best mode now known to me of applying my invention, Figure 1 is a plan view of my invention mounted upon the front or rear end of an automobile chassis, Figure 2, a front elevation of my bumper detached, Figure 3, a section of the same on line 3—3 of Figure 1 showing one tube partially broken away, Figure 4, a fragmentary transverse longitudinal section of an attaching portion of the bumper, and Figure 5, a similar section of a modified form of my invention.

Like reference characters indicates like parts throughout the views.

My bumper as herein embodied is illustrated as attached to one end of an automobile chassis 10. 11 and 12 are an axle and a pair of wheels respectively supporting the same.

My bumper is wholly composed of suitably bent flat bars of resilient or spring steel. In detail an outer impact receiving bar 15 is shaped or formed with substantially parallel rear end or attaching portions 16 extending gradually uniformly and successively outwardly, forwardly, transversely, and rearwardly to form forwardly projecting laterally extending loops 17 completed by or merging in a rearwardly directed semicircular central loop 18. Each loop 17, describes the major arc of a circle or an arc of more than 180 degrees, and is therefore substantially circular. These loops are diagonally disposed with relation to the end portions 16. In other words, the loops 17 are opposite each other and substantially lateral to the line of attachment.

Cooperating with the impact receiving loops 17 are auxiliary spring rods or arms 20 shaped from flat steel bars. Each member 20 has a rear end portion 21 engaging the inner face of one of the portions 16 of the impact member. From the portion 21 the member 20 extends symmetrically inwardly, forwardly, and outwardly to form an arcuate portion 22 extending approximately half the width of the loop 17, with its convex face in slidable contact with the concave face of the loop 17. Each arm 20 is oppositely disposed to the outer lateral portion of its adjacent loop 17, and oppositely disposel to the other arm. In this instance each arm 20 has the material of its extremity bent to form a vertical terminal tube 23 through which may pass an endless chain 25, including a split link 26 by which the chain may be severed and removed when not desired.

The end portions 16 and 21 of the members 15 and 20 are provided respectively with registering holes 27 for the reception of bolts 28 for attaching the bumper to the chassis, and the bolts may serve also to bind together the portions 16 and 21. In practice however, as shown in Figure 4, the portions are preferably united by a rivet 30; but the rivet may be omitted when the portions 16 and 21 are integral, as shown in Figure 5.

An impact from the front upon the chain meets the resistance of the loops and arms and the shock is distributed through all these resilient elements. This shock absorption is further facilitated by the slidable contact of the arm portions 22 with the loops. In the absence of the chain an impact from the front is also absorbed by the entire bumper but to a slightly less degree. There is also a cooperation of the arms and loops when an impact occurs from any direction upon the loops 17 regardless of the presence of the chain.

The gradual and uniform character of the curvature of the outer or lateral portions of the loops 17, in distinction from the abrupt and nonuniform character of the corresponding portions of U shaped and hooked bumpers, causes an object impinging thereon from the rear to glance or slide off, rather than become entangled therewith.

It will be observed that the chain is carried by the arms 20 rather than by the impact member, and thus the shock upon the chain is more gradually absorbed, and the impact member is not weakened by the presence of attaching bolts.

I claim:—

1. In a bumper for automobiles, an impact member comprising forwardly directed loops, and curved resilient arms rigid with the rear ends of the loops engaging forward portions of the loops, the lateral convexity of the loops being in a direction opposite to the direction of the lateral convexity of the arms.

2. In a bumper for automobiles, an impact member comprising connected forwardly directed loops, and arcuate resilient arms fixed to the rear portions of the loops slidably engaging forward portions of the loops, the arms being disposed in directions opposite to the directions of the lateral portions of the adjacent loops.

3. In a bumper for automobiles, an impact member comprising diagonally disposed forwardly directed loops, and resilient arms fast to the rear portions of the loops slidably engaging the sides and forward ends of the loops.

4. In a bumper for automobiles, an impact member comprising forwardly directed side loops and a rearwardly directed intermediate loop, and arms comprising rear portions fast to the rear ends of the side loops, and arcuate forward portions contacting with the side loops adjacent the intermediate loop.

5. In a bumper for automobiles, an impact member comprising substantially parallel rear end portions, forwardly projecting laterally extending substantially circular loops integral with the end portions, and a central portion continuous with the substantially circular loops, and forwardly directed arms engaging the end portions and the loops.

6. In a bumper for automobiles, an impact member comprising forwardly directed side loops and a central rearwardly directed loop, resilient arms engaging the rear ends of the side loops and in contact with forward portions of the side loops, and a flexible member disposed transversely of the central loop attached to the arms.

In testimony whereof I have affixed my signature.

SHEFFIELD SMITH.